(12) United States Patent
Yin et al.

(10) Patent No.: US 10,059,082 B2
(45) Date of Patent: Aug. 28, 2018

(54) UNI-DIRECTIONAL CLOTH, LAID FABRIC AND PREPARATION METHOD THEREOF, AND LAID FABRIC PRODUCT

(71) Applicant: ZHENGZHOU ZHONGYUAN DEFENSE MATERIAL CO., LTD, Zhengzhou (CN)

(72) Inventors: Ruiwen Yin, Zhengzhou (CN); Changgan Ji, Zhengzhou (CN); Junying Ma, Zhengzhou (CN)

(73) Assignee: Zhengzhou Zhongyuan Defense Material Co., Ltd., Zhengzhou (CN)

( * ) Notice: Subject to any disclaimer, the term of this patent is extended or adjusted under 35 U.S.C. 154(b) by 112 days.

(21) Appl. No.: 14/900,156

(22) PCT Filed: Jun. 20, 2013

(86) PCT No.: PCT/CN2013/077549
§ 371 (c)(1),
(2) Date: Dec. 19, 2015

(87) PCT Pub. No.: WO2014/201655
PCT Pub. Date: Dec. 24, 2014

(65) Prior Publication Data
US 2016/0144597 A1    May 26, 2016

(51) Int. Cl.
*B32B 5/26* (2006.01)
*B32B 37/00* (2006.01)
(Continued)

(52) U.S. Cl.
CPC .................. *B32B 5/26* (2013.01); *B32B 3/02* (2013.01); *B32B 5/022* (2013.01); *B32B 5/12* (2013.01);
(Continued)

(58) Field of Classification Search
CPC ....................................................... B32B 3/02
(Continued)

(56) References Cited

U.S. PATENT DOCUMENTS 5,935,678 A    8/1999  Park
7,923,094 B1   4/2011  Harding et al.
(Continued)

FOREIGN PATENT DOCUMENTS

| | | |
|---|---|---|
| CN | 102528998 A | 7/2012 |
| EP | 1627719 A1 | 2/2006 |
| JP | 2009-534234 A | 9/2009 |

OTHER PUBLICATIONS

Canadian Intellectual Property Office; Office Action dated Jan. 24, 2017 in corresponding Canadian Patent Application No. 2,914,957, total 4 pages.
(Continued)

*Primary Examiner* — Brent T O'Hern
(74) *Attorney, Agent, or Firm* — Masuvalley & Partners

(57) ABSTRACT

The present invention relates to a uni-directional cloth, a laid fabric, preparation method thereof and a laid fabric product, wherein the preparation method of the uni-directional cloth includes: sequentially and continuously spreading multiple ultra-high molecular weight polyethylene thin films or strips along a direction and connecting the multiple ultra-high molecular weight polyethylene thin films or strips into a whole to obtain the uni-directional cloth; and the laid fabric is prepared on the basis of the uni-directional cloth and the laid fabric product is prepared on the basis of the laid fabric.

5 Claims, 4 Drawing Sheets

(51) Int. Cl.
- *B32B 3/02* (2006.01)
- *B32B 5/12* (2006.01)
- *B32B 37/10* (2006.01)
- *B32B 37/12* (2006.01)
- *B32B 5/02* (2006.01)
- *B32B 7/00* (2006.01)
- *B32B 7/04* (2006.01)
- *B32B 7/12* (2006.01)
- *B32B 27/08* (2006.01)
- *B32B 27/32* (2006.01)

(52) U.S. Cl.
CPC ............... *B32B 7/005* (2013.01); *B32B 7/04* (2013.01); *B32B 7/12* (2013.01); *B32B 27/08* (2013.01); *B32B 27/32* (2013.01); *B32B 37/00* (2013.01); *B32B 37/10* (2013.01); *B32B 37/12* (2013.01); *B32B 2250/20* (2013.01); *B32B 2250/242* (2013.01); *B32B 2262/0253* (2013.01); *B32B 2307/718* (2013.01); *B32B 2571/02* (2013.01)

(58) Field of Classification Search
USPC .......................................................... 428/58
See application file for complete search history.

(56) References Cited

U.S. PATENT DOCUMENTS

2006/0210749 A1* 9/2006 Geva ..................... B32B 5/12
 428/36.1
2010/0003452 A1 1/2010 Jongedijk et al.

OTHER PUBLICATIONS

ISA/CN Authorized officer, Xiaowei Gao, International Search Report dated Mar. 27, 2014 in International Application No. PCT/CN2013/077549, total 6 pages with translation.

EPO, Extended European Search Report dated Nov. 23, 2016 in corresponding European Patent Application No. 13887326.0, total 7 pages.

* cited by examiner

UNI-DIRECTIONAL CLOTH, LAID FABRIC AND PREPARATION METHOD THEREOF, AND LAID FABRIC PRODUCT

RELATED APPLICATIONS

This application is the U.S. National Phase application under 35 U.S.C. § 371 of International Patent Application No. PCT/CN2013/077549, International Filing Date Jun. 20, 2013, entitled UNI-DIRECTIONAL CLOTH, LAID FABRIC AND PREPARATION METHOD THEREOF, AND LAID FABRIC PRODUCT; all of which is incorporated herein by reference in its entirety.

FIELD OF THE INVENTION

The present invention relates to a chemical fiber fabric, in particular a uni-directional cloth, a laid fabric, preparation method thereof and a laid fabric product.

BACKGROUND OF THE INVENTION

An ultra-high molecular weight polyethylene (UHMW-PE) fiber is a synthetic fiber. Its molecular structure has very high straightening parallelism and degree of orientation, and such molecular structure determines that the ultra-high molecular weight polyethylene fiber has very high strength and modulus and has the advantages of good chemical stability, corrosion resistance and the like. The above properties of the ultra-high molecular weight polyethylene fiber are better than those of an aramid fiber, and the ultra-high molecular weight polyethylene fiber is widely used in the field of bulletproof protection for military and polices and becomes a mainstream material replacing a traditional steel structure bulletproof material in the field.

The strength of a uni-directional cloth (Uni-Directional Cloth, also known as UD fabric) is centralized in a certain direction. A laid fabric can be prepared by crisscross laminating the multiple uni-directional cloth at certain angles. At present, the laid fabric made of the ultra-high molecular weight polyethylene fibers is generally prepared by adopting the following process: tidily arranging multiple ultra-high molecular weight polyethylene fibers by a warping process of realizing uniformity, parallelism, straightness and the like, bonding the various fibers with an adhesive to prepare the uni-directional cloths, sequentially crisscross spreading the multiple uni-directional cloths according to 0 degree/90 degrees and bonding the uni-directional cloths with the adhesive to prepare the laid fabric.

The uni-directional cloth prepared by the existing process comprises: the multiple ultra-high molecular weight polyethylene fibers which are warped along a direction and bonded into a whole. As each ultra-high molecular weight polyethylene fiber is of a tow-like structure and each ultra-high molecular weight polyethylene fiber is an independent individual, the warping process of the fibers is complex, the production cost is high, the fibers are liable to breaking, distortion, intertwining, knotting, non-uniform arrangement and other defects in warping, coating and other process flows, these defects will hinder the effective energy transfer of external force by the uni-directional cloth or the laid fabric and are liable to causing stress concentration, and the strength, the bulletproof performance and other performances of the uni-directional cloth or the laid fabric are further reduced.

SUMMARY OF THE INVENTION

The brief summary of the present invention is given below to facilitate the basic understanding of some aspects of the present invention. It should be understood that the summary is not an exhaustive summary of the invention. It is not intended to determine key or important parts of the invention or limit the scope of the invention. It only aims at presenting some concepts in a simplified form as a prelude to the more detailed description which will be discussed later.

The present invention provides a uni-directional cloth with low cost and high strength, a laid fabric, preparation method thereof and a laid fabric product.

In a first aspect, the present invention provides a preparation method of a uni-directional cloth, including:

sequentially and continuously spreading multiple ultra-high molecular weight polyethylene thin films or strips along a direction; and connecting the multiple ultra-high molecular weight polyethylene thin films or strips into a whole to obtain the uni-directional cloth.

Optionally, the connecting the multiple ultra-high molecular weight polyethylene thin films or strips into a whole includes:

coating an adhesive at an adjacent part of every two ultra-high molecular weight polyethylene thin films or strips to bond the multiple ultra-high molecular weight polyethylene thin films or strips into a whole.

Optionally, after coating the adhesive at the adjacent part of every two ultra-high molecular weight polyethylene thin films or strips, the preparation method further includes: drying the adhesive.

Optionally, the drying the adhesive includes: drying the adhesive at 80-120° C.

Optionally, any two adjacent ultra-high molecular weight polyethylene thin films or strips are at least partially overlapped; and the connecting the multiple ultra-high molecular weight polyethylene thin films or strips into a whole includes: bonding or hot-pressing the overlapped parts of any two adjacent ultra-high molecular weight polyethylene thin films or strips into a whole.

Optionally, the control conditions for hot-pressing include: the temperature is 50-130° C. and/or the pressure is 1-15 MPa.

Optionally, the direction is the width direction of the ultra-high molecular weight polyethylene thin film or strip.

Optionally, the width direction is perpendicular to the straightening direction of a molecular chain of the ultra-high molecular weight polyethylene thin film or strip.

Optionally, the related parameters of the ultra-high molecular weight polyethylene thin film at least meet one or more of the following conditions:

the linear density is above 5000 deniers;
the width is above 100 mm;
the thickness is below 0.2 mm;
the breaking strength is above 10 grams/denier;
the tensile modulus is above 800 grams/denier; and
the elongation at break is below 6%.

Optionally, the related parameters of the ultra-high molecular weight polyethylene strip at least meet one or more of the following conditions:

the linear density is above 100 deniers;
the width is 1-100 mm;
the thickness is below 0.2 mm;
the breaking strength is above 10 grams/denier;
the tensile modulus is above 800 grams/denier; and
the elongation at break is below 6%.

In a second aspect, the present invention provides a uni-directional cloth which is prepared by the above preparation method of the uni-directional cloth.

In a third aspect, the present invention further provides a preparation method of a laid fabric, including: sequentially crisscross compounding and laminating multiple uni-directional cloths at certain angles into a whole to obtain the laid fabric, wherein each uni-directional cloth includes: multiple ultra-high molecular weight polyethylene thin films or strips which are sequentially and continuously spread and mutually connected along a direction.

Optionally, the sequentially crisscross compounding and laminating the multiple uni-directional cloths at the certain angles into a whole includes: sequentially crisscross laminating and spreading the multiple uni-directional cloths at certain angles and hot-pressing or bonding overlapped parts of the multiple uni-directional cloths.

Optionally, one surface of each uni-directional cloth is coated with an adhesive, and the other surface of each uni-directional cloth is not coated with the adhesive; and the bonding any two adjacent uni-directional cloths includes: bonding the surface coated with the adhesive of one uni-directional cloth with the surface which is not coated with the adhesive of another uni-directional cloth in the process of crisscross compounding any two uni-directional cloths at certain angles.

Optionally, the intersection angles of any two adjacent uni-directional cloths are the same.

Optionally, the intersection angles are 0-90 degrees.

Optionally, the intersection angles are 45 degrees or 90 degrees.

Optionally, the intersection angles of at least two uni-directional cloths in the various uni-directional cloths are different from the intersection angles of other uni-directional cloths.

Optionally, the intersection angles of the two adjacent uni-directional cloths from the first uni-directional cloth to the last uni-directional cloth are gradually increased.

In a fourth aspect, the present invention further provides a laid fabric which is prepared by adopting the preparation method of the laid fabric.

In a fifth aspect, the present invention further provides a laid fabric product which is prepared from the laid fabric.

In the embodiments of the present invention, the ultra-high molecular weight polyethylene thin film or strip is a thin slice made of ultra-high molecular weight polyethylene and has a certain width and thickness, the width is much greater than the thickness, the strip is a strip-like thin slice which can be prepared independently or be formed by performing slitting process step before and after stretching the thin film, wherein the width of the strip is less than the width of the thin film, and the thickness is equivalent to that of the thin film. The ultra-high molecular weight polyethylene thin film or strip itself has a certain width and thickness, is of an integral structure without integration points or trim lines and has the advantages of high strength, great modulus, small creep property, a relatively small stress concentration influence scope along the edge direction of the thin film and the like.

The uni-directional cloth or the laid fabric provided in each embodiment of the present invention is prepared on the basis of the ultra-high molecular weight polyethylene thin films or strips. Compared with the uni-directional cloth or the laid fabric prepared from traditional ultra-high molecular weight polyethylene fibers, the various fibers do not need to be subject to a trivial process for warping treatment, and the amount of glue is obviously reduced and even avoided (if the adjacent ultra-high molecular weight polyethylene thin films or strips can be partially overlapped and connected by hot-pressing and the like), thereby reducing the probability of causing injuries to the interior of the ultra-high molecular weight polyethylene thin films or strips by the preparation process and being conductive to simplifying the process, lowering the cost and improving the production efficiency.

In addition, as macromolecular straight chain structures in the ultra-high molecular weight polyethylene thin films or strips are uniformly distributed, the probability of causing damages to the interior of the thin films or strips in the preparation process of the uni-directional cloth or the laid fabric is relatively low, the defects of breaking, distortion, intertwining, knotting, non-uniform arrangement and the like can be avoided, when the uni-directional cloth or the laid fabric prepared on the basis of the ultra-high molecular weight polyethylene thin films or strips is subject to an external force impact, the ultra-high molecular weight polyethylene thin films or strips are stressed as a whole, and force-bearing points can be diffused to force-bearing surfaces rapidly to effectively transfer energy, thereby improving the strength of the uni-directional cloth or the laid fabric and improving the bulletproof performance and other protection performances thereof.

These and other advantages of the present invention will be evident through the following detailed description of optional embodiments of the present invention in conjunction with the accompanying drawings.

BRIEF DESCRIPTION OF THE DRAWINGS

The present invention can be better understood through the following description in conjunction with the accompanying drawings, wherein the same or similar reference symbols are used in all the drawings to represent the same or similar parts. The accompanying drawings in conjunction with the detailed description are included in the description and form one part of the description, and are used for further illustrating the optional embodiments of the present invention and explaining the principle and the advantages of the invention. Wherein.

Figure 1:
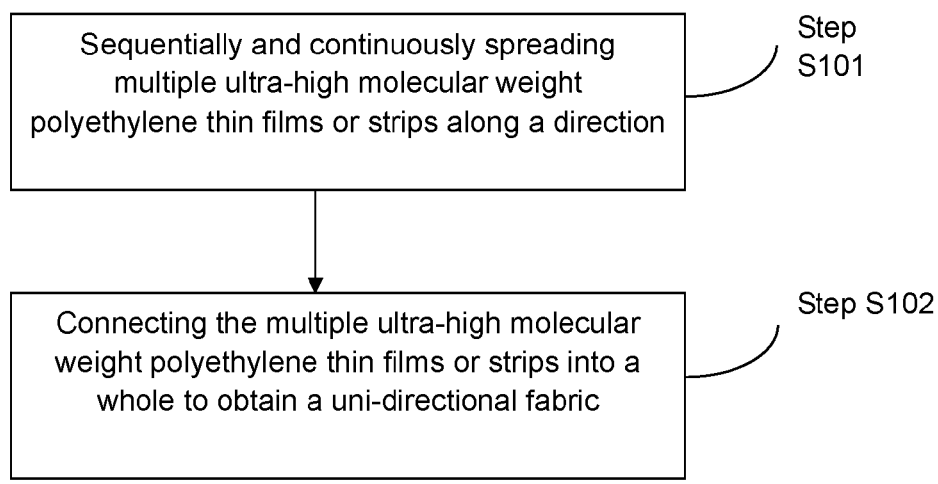
FIG. 1 is a flow diagram of an embodiment of a preparation method of a uni-directional cloth provided by the present invention.

Those of skilled in the art should understand that elements in the accompanying drawings are only illustrated for simplicity and clarity, and are not necessarily drawn to scale. For example, the sizes of some elements in the accompanying drawings may be exaggerated relative to other elements so as to assist in the improvement of the understanding of the embodiments of the present invention.

DETAILED DESCRIPTION OF THE EMBODIMENTS

The exemplary embodiments of the present invention will be described in detail below in conjunction with the accompanying drawings. For clarity and brevity, not all the characteristics of the actual implementation ways are described in the description. However, it should be understood that, in the process of developing any of these actual embodiments, many decisions which are specific to the implementation ways must be made to facilitate the implementation of specific targets of development staff, such as those limitation conditions which are related to a system and business, and these limitation conditions can change along with different implementation ways. In addition, it should also be understood that, although the development work may be very complex and time-consuming, the development work is just a routine task for those skilled in the art and benefiting from the disclosure of the present invention.

Herein, it still needs to be noted that, in order to prevent the unnecessary details from obscuring the present invention, only the device structure and/or the treatment steps which are closely related to the solutions of the invention are described in the accompanying drawings and the description, and the representations and the descriptions of the parts and the treatments which are not closely related to the invention and known to those of ordinary skill in the art are omitted.

Ultra-high molecular weight polyethylene is polyethylene with the molecular weight of above 1 million. The traditional technologies applying the ultra-high molecular weight polyethylene take ultra-high molecular weight polyethylene fibers as the basis to prepare various products. The technical solutions provided by the various embodiments of the present invention are essentially different from the traditional technologies applying ultra-high molecular weight polyethylene and are revolutionary innovations against the traditional technologies, namely, the ultra-high molecular weight polyethylene thin films or strips are used for replacing ultra-high molecular weight fibers to perform development and preparation of the uni-directional cloth and the laid fabric, and the core concept mainly includes: the ultra-high molecular weight polyethylene thin films or strips are used for replacing the traditional ultra-high molecular weight polyethylene fibers to prepare the uni-directional cloth and the laid fabric.

Wherein, the ultra-high molecular weight polyethylene thin film or strip is a thin slice which is made of ultra-high molecular weight polyethylene and has a certain width and thickness, the width is much greater than the thickness, the strip is a strip-like thin slice which is formed by performing slitting process step before and after stretching the thin film, wherein the width of the strip is less than the width of the thin film, and the thickness is equivalent to or greater than that of the thin film.

The ultra-high molecular weight polyethylene thin film or strip provided by the present invention is different from the ultra-high molecular weight polyethylene fibers and also different from a plane formed by bonding the multiple ultra-high molecular weight polyethylene fibers, and the significant difference lies in that: the ultra-high molecular weight polyethylene thin film or strip provided by the present invention has a certain width and thickness and is of an integral structure without integration points or trim lines.

The uni-directional cloth or the laid fabric provided in each embodiment of the present invention is prepared on the basis of the ultra-high molecular weight polyethylene thin films or strips. In the preparation process, the ultra-high molecular weight polyethylene thin films or strips are taken as a whole for treatment, thereby having good structural integrity, being simple in preparation process, eliminating a complex process for respectively arranging multiple fiber silks, obviously reducing the probability of producing burrs on the surfaces of the thin films or strips and also obviously reducing the probability of producing breaking, distortion, intertwining and other phenomena in the thin films or strips. When bearing a load, the ultra-high molecular weight polyethylene thin films or strips are stressed as a whole, so that the strength of the uni-directional cloth or the laid fabric is relatively high and the strength utilization ratio is effectively improved. Thus, the strength of the uni-directional cloth or the laid fabric prepared on the basis of the ultra-high molecular weight polyethylene thin films or strips is higher than a product prepared by adopting the ultra-high molecular weight polyethylene fibers with the same denier number, the cost of the former is obviously lower than the latter, and the uni-directional cloth or the laid fabric has the advantages of good structural integrity, high strength, high strength utilization ratio, high production efficiency, low processing cost, light weight, small surface density, good flexibility and the like.

The technical solutions of the present invention are further described by taking the optional structures of the rigging and the preparation method thereof as examples below in conjunction with the accompanying drawings.

Embodiment 1

As shown in FIG. 1, a preparation method of a uni-directional cloth provided by the present invention includes:

Step S101, sequentially and continuously spreading multiple ultra-high molecular weight polyethylene thin films or strips along a direction; and Step S102, connecting multiple ultra-high molecular weight polyethylene thin films or strips into a whole to obtain the uni-directional cloth.

The core concept of the embodiment is that, the ultra-high molecular weight polyethylene thin films or strips are used for directly replacing the traditional ultra-high molecular weight polyethylene fibers to prepare the uni-directional cloth.

The multiple ultra-high molecular weight polyethylene thin films or strips are sequentially and continuously spread along the width direction of the ultra-high molecular weight polyethylene thin films or strips, and the width direction is perpendicular to the straightening direction of molecular chains of the ultra-high molecular weight polyethylene thin films or strips.

In the embodiment, in order to enable the surfaces of the ultra-high molecular weight polyethylene thin films or strips to have higher smoothness, optionally, the ultra-high molecular weight polyethylene thin films or strips are sequentially and continuously spread through a tension regulating roller at the drawing tension of not more than 5 g/d.

Specifically, the connecting the multiple ultra-high molecular weight polyethylene thin films or strips into a whole includes:

coating an adhesive at an adjacent part of every two ultra-high molecular weight polyethylene thin films or strips to bond the multiple ultra-high molecular weight polyethylene thin films or strips into a whole.

Optionally, any two adjacent ultra-high molecular weight polyethylene thin films or strips are at least partially overlapped; and the overlapped parts are coated with the adhesive, compared with the traditional laid fabric, lining membranes are not required, and only the overlapped parts need to be coated with the adhesive, thereby effectively reducing the amount of glue, further reducing the internal injuries of the ultra-high molecular weight polyethylene thin films or strips, being conductive to simplifying the process, lowering the cost and improving the production efficiency.

Optionally, any two adjacent ultra-high molecular weight polyethylene thin films or strips are bonded and are not mutually overlapped, and the adhesive is coated on the adjacent parts of any two adjacent ultra-high molecular weight polyethylene thin films or strips to bond the two ultra-high molecular weight polyethylene thin films or strips together, thereby utilizing the area of the ultra-high molecular weight polyethylene thin films or strips to the greatest extent, reducing the amount of the glue to the greatest extent, further simplifying the process, lowering the cost and improving the production efficiency.

In addition, the connecting the multiple ultra-high molecular weight polyethylene thin films or strips into a whole includes: hot-pressing the overlapped parts of any two adjacent ultra-high molecular weight polyethylene thin films or strips into a whole.

The control conditions for hot-pressing include: the temperature is 50-130° C. and/or the pressure is 1-15 MPa; and the hot-pressing temperature is lower than a melting point of the ultra-high molecular weight polyethylene thin films or strips.

Connecting the multiple ultra-high molecular weight polyethylene thin films or strips into a whole by adopting a hot-pressing way, the coating of the adhesive is not required, thereby reducing the internal injuries of the ultra-high molecular weight polyethylene thin films or strips to the greatest extent, further simplifying the process, reducing the cost and improving the production efficiency.

Optionally, after coating the adhesive at the adjacent parts of every two ultra-high molecular weight polyethylene thin films or strips, the preparation method further includes: drying the adhesive.

Optionally, in order to obtain a better drying effect, the drying the adhesive includes: drying the adhesive at 80-120° C., the temperature is lower than the melting point of the ultra-high molecular weight polyethylene thin films or strips, and the injuries to the thin films or strips can be avoided when the adhesive is dried.

Optionally, the uni-directional cloth after drying is cooled down.

Optionally, the prepared uni-directional cloth is wound into a coil to improve the uniformity of a production workshop.

The related parameters of the ultra-high molecular weight polyethylene thin film in each embodiment of the present invention at least meet one or more of the following conditions: the linear density is above 5000 deniers; the width is above 100 mm; the thickness is below 0.2 mm; the breaking strength is above 10 grams/denier; the tensile modulus is above 800 grams/denier; and the elongation at break is below 6%.

The related parameters of the ultra-high molecular weight polyethylene strip in each embodiment of the present invention at least meet one or more of the following conditions: the linear density is above 100 deniers; the width is 1-100 mm; the thickness is below 0.2 mm; the breaking strength is above 10 grams/denier; the tensile modulus is above 800 grams/denier; and the elongation at break is below 6%.

According to the preparation method of the uni-directional cloth provided by the embodiment, the preparation is performed on the basis of the ultra-high molecular weight polyethylene thin films or strips, and compared with the traditional uni-directional cloth prepared on the basis of the ultra-high molecular weight polyethylene fibers, the various fibers do not need to be subject to a trivial process for warping treatment, thereby reducing the probability of causing injuries to the interior of the ultra-high molecular weight polyethylene thin films or strips by the preparation process and being conductive to simplifying the process, lowering the cost and improving the production efficiency.

Embodiment 2

The present invention provides a uni-directional cloth, including multiple ultra-high molecular weight polyethylene thin films or strips which are sequentially and continuously spread and mutually connected along a direction.

In the embodiment, the ultra-high molecular weight polyethylene thin film is a thin slice made of ultra-high molecular weight polyethylene and has a certain width and thickness, the width is much greater than the thickness, the strip is a strip-like thin slice which is formed by performing slitting process step before and after stretching the thin film, wherein the width of the strip is less than the width of the thin film, and the thickness is equivalent to that of the thin film. The ultra-high molecular weight polyethylene thin film or strip itself has a certain width and thickness, is of an integral structure without integration points or trim lines and has the advantages of high strength, great modulus, small creep property, a relatively small stress concentration influence scope along the edge direction of the thin film and the like.

Optionally, the direction is the width direction of the ultra-high molecular weight polyethylene thin film or strip.

Optionally, the width direction is perpendicular to the straightening direction of a molecular chain of the ultra-high molecular weight polyethylene thin film or strip.

Figure 2:
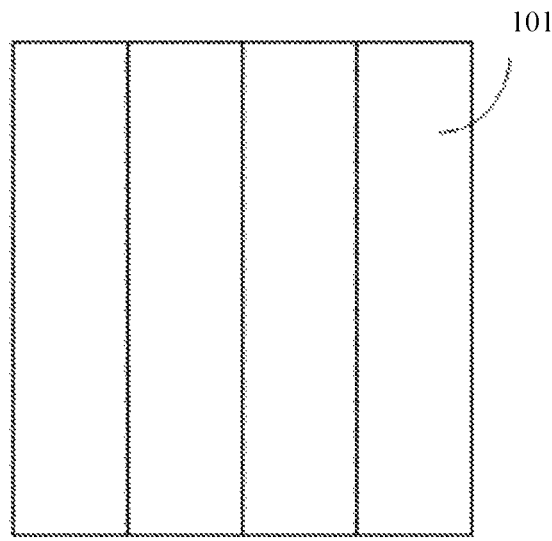
FIG. 2 is a schematic diagram of the structure of the first embodiment of a uni-directional cloth provided by the present invention.

As shown in FIG. 2, by taking the ultra-high molecular weight polyethylene strips as an example for illustration, the multiple ultra-high molecular weight polyethylene strips 101 are sequentially and continuously spread and connected along the transverse direction, wherein the direction of molecular chains of the ultra-high molecular weight polyethylene strips 101 is the longitudinal direction, namely, the spreading direction is perpendicular to the direction of the molecular chains of the ultra-high molecular weight polyethylene strips 101, and when being subject to an external force impact, the external force is diffused along the direction of the molecular chains.

Optionally, any two adjacent ultra-high molecular weight polyethylene thin films or strips are at least partially overlapped, and the overlapped parts are bonded or connected by hot pressing.

Figure 3:
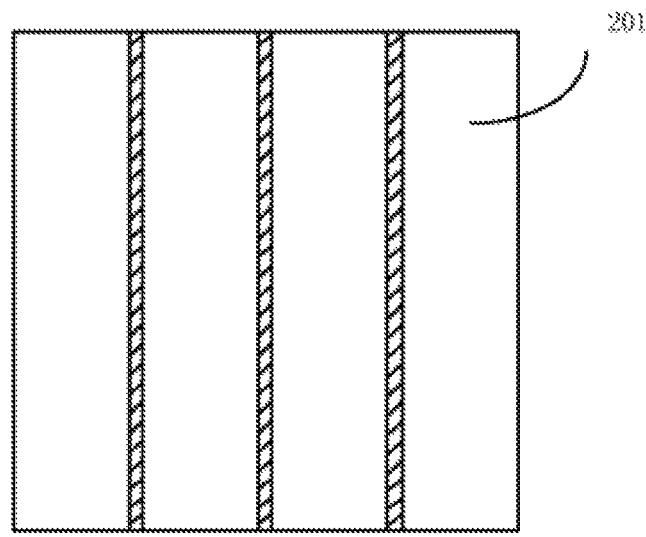
FIG. 3 is a schematic diagram of the structure of the second embodiment of the uni-directional cloth provided by the present invention.

As shown in FIG. 3, by taking the ultra-high molecular weight polyethylene strips as an example for illustration, the overlapped parts of the two adjacent ultra-high molecular weight polyethylene strips 201 are coated with glue to bond the two adjacent ultra-high molecular weight polyethylene strips 201 together. Compared with a traditional laid fabric, for the uni-directional cloth obtained by adopting the way, lining membranes are not required, and only the overlapped parts need to be coated with the glue, thereby effectively reducing the amount of glue, further reducing the internal injuries of the ultra-high molecular weight polyethylene thin films or strips, being conductive to simplifying the process, reducing the cost and improving the production efficiency.

In addition, the two adjacent ultra-high molecular weight polyethylene strips 201 can be connected together by hot-pressing the overlapped parts through a hot-pressing way, and the coating of the glue is not required, thereby reducing the internal injuries of the ultra-high molecular weight polyethylene thin films or strips to the greatest extent, further simplifying the process, lowering the cost and improving the production efficiency.

Figure 4:
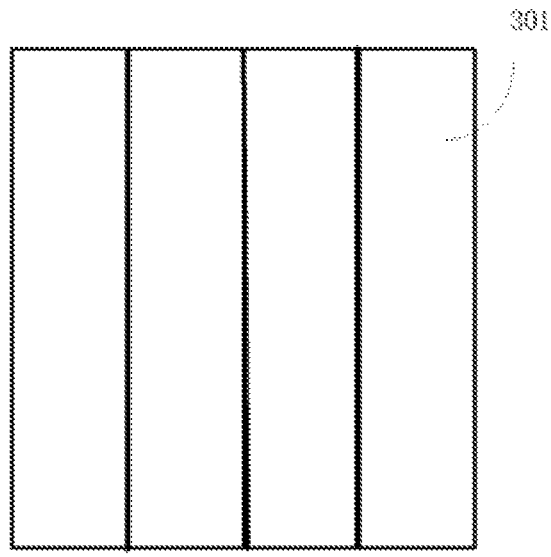
FIG. 4 is a schematic diagram of the structure of the third embodiment of the uni-directional cloth provided by the present invention.

Optionally, any two adjacent ultra-high molecular weight polyethylene thin films or strips are bonded and are not mutually overlapped, as shown in FIG. 4, by taking the ultra-high molecular weight polyethylene strips as an example for illustration, the glue is coated on the adjacent parts of any two adjacent ultra-high molecular weight polyethylene strips 301 to bond the two ultra-high molecular weight polyethylene strips 301 together, and the uni-directional cloth prepared by adopting the way can utilize the area of the ultra-high molecular weight polyethylene thin films or strips to the greatest extent, reduce the amount of the glue to the greatest extent, and further simplify the process, reduce the cost and improve the production efficiency.

The uni-directional cloth provided by the embodiment is prepared on the basis of the ultra-high molecular weight polyethylene thin films or strips, and compared with the traditional uni-directional cloth prepared on the basis of the ultra-high molecular weight polyethylene fibers, the various fibers do not need to be subject to a trivial process for warping treatment, thereby reducing the probability of causing injuries to the interior of the ultra-high molecular weight polyethylene thin films or strips by the preparation process and being conductive to simplifying the process, lowering the cost and improving the production efficiency; and in addition, when being subject to an external force impact, the ultra-high molecular weight polyethylene thin films or strips are stressed as a whole, and force-bearing points can be diffused to force-bearing surfaces rapidly to effectively transfer energy, thereby improving the strength of the uni-directional cloth or the laid fabric and improving the bulletproof performance and other protection performances thereof.

Embodiment 3

Figure 5:
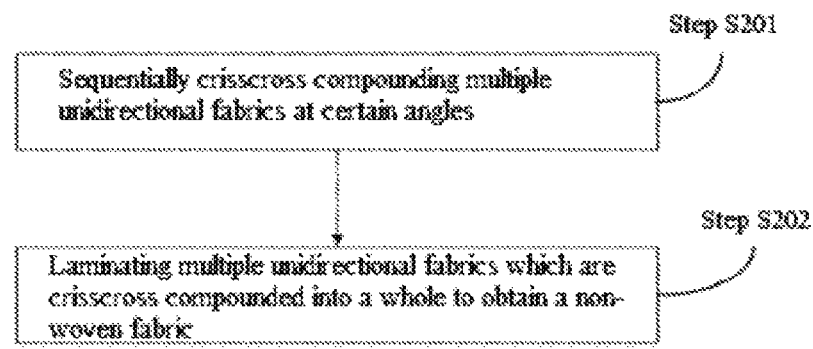
FIG. 5 is a flow diagram of an embodiment of a preparation method of a laid fabric provided by the present invention.

As shown in FIG. 5, the embodiment provides a preparation method of a laid fabric, including:

Step S201, sequentially crisscross compounding multiple uni-directional cloths at certain angles;

Step S202, laminating the multiple uni-directional cloths which are crisscross compounded into a whole to obtain the laid fabric.

The uni-directional cloth includes: multiple ultra-high molecular weight polyethylene thin films or strips which are sequentially and continuously spread and mutually connected along a direction.

Optionally, the sequentially crisscross compounding the multiple uni-directional cloths at the certain angles into a whole includes:

sequentially crisscross laminating and spreading the multiple uni-directional cloths at certain angles and hot-pressing or bonding overlapped parts of the multiple uni-directional cloths.

If the bonding way is adopted, one surface of each uni-directional cloth is coated with an adhesive, the other surface of each uni-directional cloth is not coated with the adhesive, and one surface coated with the adhesive of one uni-directional cloth is bonded with the surface which is not coated with the adhesive of another uni-directional cloth.

If the hot-pressing way is adopted, the coating of the adhesive is not required, thereby being conductive to simplifying the process, lowering the cost and improving the production efficiency.

Optionally, the intersection angles of any two adjacent uni-directional cloths are the same, and the intersection angles are 0-90 degrees.

Further, the intersection angles are 45 degrees or 90 degrees.

Optionally, the intersection angles of at least two uni-directional cloths in the various uni-directional cloths are different from the intersection angles of other uni-directional cloths.

Further, the intersection angles of the two adjacent uni-directional cloths from the first uni-directional cloth to the last uni-directional cloth are gradually increased, and the laid fabric prepared by adopting the way is mainly applied to manufacturing helmets.

The formed laid fabric can be formed by compounding two layers, or compounding four layers or compounding eight layers.

The preparation method of the laid fabric provided by the embodiment adopts the uni-directional cloths prepared from the ultra-high molecular weight polyethylene thin films or strips to prepare the laid fabric, the process is simple, the production cost is low, and the prepared laid fabric can be applied to the fields of national defense military, individual protection and civil use, such as bulletproof floors of helicopters, armored seats, reinforced cabinet doors, armored protection plates of tanks and ships, anti-scrap liners, synthetic anti-ballistic armors of tracked vehicles, tactical vehicles and commercial armored vehicles, housings of bulletproof cash carrying vehicles and armored weapons, protective housing covers of radars, bulletproof vests, bulletproof insert plates, helmets, bulletproof, puncture-proof, bulletproof and explosion-proof suitcases and other high-strength composite materials, such as high-strength suitcases, crashproof poles for the automobiles and the like.

Embodiment 4

The present invention provides a laid fabric which is formed by crisscross compounding and laminating the multiple uni-directional cloths described in the above embodiment at certain angles.

Optionally, the intersection angles of any two adjacent uni-directional cloths are the same and can also be different, and the intersection angles are 0-90 degrees.

Figure 6:
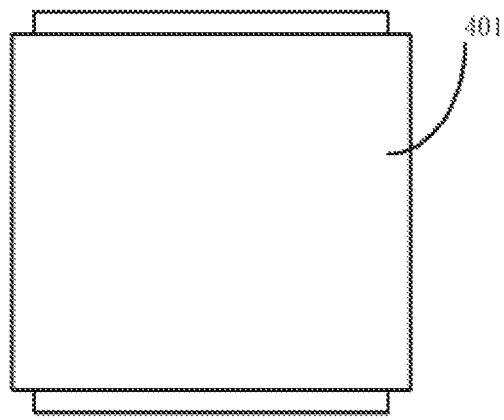
FIG. 6 is a schematic diagram of the structure of the first embodiment of a laid fabric provided by the present invention.

As an optional implementation way, as shown in FIG. 6, the multiple uni-directional cloths 401 are compounded and laminated to form the laid fabric, and the intersection angles of the two adjacent uni-directional cloths 401 are 90 degrees.

Figure 7:
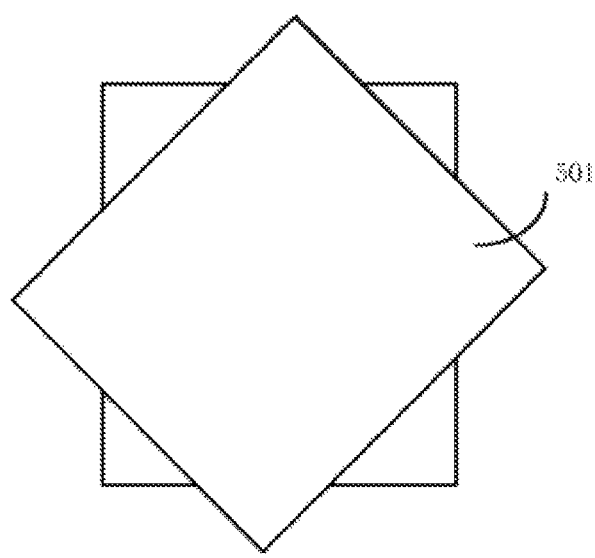
FIG. 7 is a schematic diagram of the structure of the second embodiment of the laid fabric provided by the present invention.

As an optional implementation way, as shown in FIG. 7, the multiple uni-directional cloths 501 are compounded and laminated to form the laid fabric, and the intersection angles of the two adjacent uni-directional cloths 501 are 45 degrees.

Figure 8:
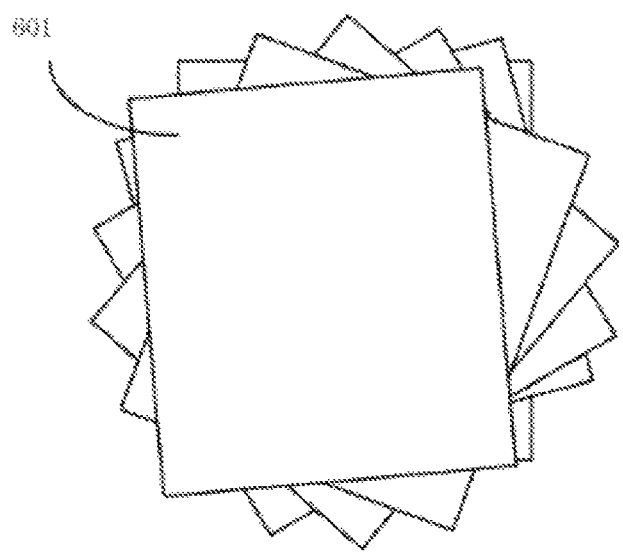
FIG. 8 is a schematic diagram of the structure of the third embodiment of the laid fabric provided by the present invention.

As an optional implementation way, as shown in FIG. 8, the multiple uni-directional cloths 601 are compounded and laminated to form the laid fabric, in all the uni-directional cloths, the intersection angles of at least two uni-directional cloths are different from the intersection angles of other uni-directional cloths, the intersection angles of the two adjacent uni-directional cloths from the first uni-directional cloth to the last uni-directional cloth are gradually increased, and the laid fabric prepared by adopting the way is mainly applied to manufacturing helmets.

Optionally, the overlapped parts of the two adjacent uni-directional cloths are bonded or connected by hot pressing. If the bonding way is adopted, one surface of each uni-directional cloth is coated with glue, the other surface of each uni-directional cloth is not coated with the glue, and one surface coated with the glue of one uni-directional cloth is bonded with the surface which is not coated with the glue of another uni-directional cloth.

Experimental Tests:

The above laid fabric can be formed by compounding two layers or compounding four layers or compounding eight layers, and the corresponding surface densities are 60 g/m$^2$, 120 g/m$^2$ and 240 g/m$^2$ respectively.

50 layers of four-layer compounded laid fabrics with the surface density of 120 g/m$^2$ were taken and mutually overlapped, the size was cut into 400 mm×400 mm and loaded into a bag, the back was lined with a clay target plate, a bullet attack test was performed according to national standard GA141 with a type 54 pistol and a type 51 lead core bullet, and the test result was that V50≥600 m/s.

25 layers of eight-layer compounded laid fabrics with the surface density of 240 g/m$^2$ were taken and mutually overlapped, the adjacent uni-directional cloths were crisscross arranged by 0°/90°, the size was cut into 400 mm×400 mm and loaded into a bag, the back was lined with the clay target plate, the bullet attack test was performed according to national standard GA141 with the type 54 pistol and the type 51 lead core bullet, and the test result was that V50≥620 m/s.

It can be known from the test results that the laid fabric based on the ultra-high molecular weight polyethylene thin films or strips show an excellent bulletproof effect and can effectively resist the threat of the bullet. The laid fabric has the advantages of light weight and good bulletproof effect and can be widely applied to bulletproof vests, bulletproof insert plates, helmets, bulletproof and puncture-proof clothes, back liners of armored vehicles, seats of helicopters and other high-strength composite materials, such as high-strength suitcases, crashproof poles for automobiles and the like.

The laid fabric provided by the embodiment is formed by compounding the uni-directional cloths prepared from the ultra-high molecular weight polyethylene thin films or strips, and when being subject to an external force impact, the ultra-high molecular weight polyethylene thin films or strips are stressed as a whole, and force-bearing points can be diffused to force-bearing surfaces rapidly to effectively transfer energy, so that the laid fabric has the advantages of high strength, great modulus, small creep property, a relatively small stress concentration influence scope along the edge direction of the thin film and the like and can be widely applied to the fields of national defense military, individual protection and civil use, such as bulletproof floors of helicopters, armored seats, reinforced cabinet doors, armored protection plates of tanks and ships, anti-scrap liners, synthetic anti-ballistic armors of tracked vehicles, tactical vehicles and commercial armored vehicles, housings of bulletproof cash carrying vehicles and armored weapons, protective housing covers of radars, bulletproof vests, bulletproof insert plates, helmets, bulletproof, puncture-proof, bulletproof and explosion-proof suitcases and other high-strength composite materials, such as high-strength suitcases, crashproof poles for the automobiles and the like.

Embodiment 5

The embodiment provides a laid fabric product prepared from a laid fabric, the laid fabric is prepared by crisscross compounding and laminating multiple uni-directional cloths at certain angles, and each uni-directional cloth includes multiple ultra-high molecular weight polyethylene thin films or strips which are sequentially and continuously spread and mutually connected along a direction.

The laid fabric product provided by the embodiment can be used for, but is not limited to bulletproof floors of helicopters, armored seats, reinforced cabinet doors, armored protection plates of tanks and ships, anti-scrap liners, synthetic anti-ballistic armors of tracked vehicles, tactical vehicles and commercial armored vehicles, housings of bulletproof cash carrying vehicles and armored weapons, protective housing covers of radars, bulletproof vests, bulletproof insert plates, helmets, bulletproof, puncture-proof, bulletproof and explosion-proof suitcases and other high-strength composite materials, such as high-strength suitcases, crashproof poles for automobiles and the like.

As for the laid fabric product provided by the embodiment, as the laid fabric is prepared from the uni-directional cloths prepared from the ultra-high molecular weight polyethylene thin films or strips, when being subject to an external force impact, the ultra-high molecular weight polyethylene thin films or strips are stressed as a whole, and force-bearing points can be diffused to force-bearing surfaces rapidly to effectively transfer energy. Thus, the laid fabric product prepared from the laid fabric has higher strength and better bulletproof performance.

Although the present invention and the advantages thereof have been described in detail, it should be understood that various changes, substitutions and modifications can be made without exceeding the spirit and the scope of the invention limited by the accompanying claims.

Finally, it needs to be noted that, the relation terms, such as first, second and the like herein are only used to differentiate one entity or operation from another entity or operation, and do not necessarily require or imply that these entities or operations have any actual relation or sequence. Furthermore, terms "including", "comprising" or any other variations thereof are intended to cover non-exclusive inclusion, so that the process, method, the object or the equipment including a series of elements includes not only those elements, but also other elements which are not listed clearly, or further include the inherent elements of the process, the method, the object or the equipment. Without more limitations, the element limited by the sentence "including one . . . " does not exclude that the process, the method, the object or the equipment including the element further has other identical elements.

Although the embodiments of the present invention have been described in detail in conjunction with the accompanying drawings, it should be understood that the implementation ways described above are only used for describing the invention rather than limiting the invention. For those skilled in the art, various modifications and changes can be made to the above implementation ways without deviating from the spirit and the scope of the invention. Thus, the scope of the invention is only limited by the accompanying claims and equivalent contents thereof.

The invention claimed is:

1. A uni-directional cloth, characterized in that the cloth is prepared by sequentially and continuously spreading multiple ultra-high molecular weight polyethylene films or strips along a direction; and connecting the multiple ultra-high molecular weight polyethylene films or strips into a whole to obtain the uni-directional cloth, wherein a ultra-high molecular weight polyethylene film or strip has a certain width and thickness and has an integral structure without integration points or trim lines;

wherein any two adjacent ultra-high molecular weight polyethylene films or strips are not mutually overlapped, and overlapping parts of the two adjacent ultra-high molecular weight polyethylene films or strips are bonded to each other by an adhesive.

2. The uni-directional cloth according to claim 1, wherein the direction is a width direction of the ultra-high molecular weight polyethylene film or strip, wherein the width direction is perpendicular to the straightening direction of a molecular chain of the ultra-high molecular weight polyethylene film or strip.

3. The uni-directional cloth according to claim 1, wherein the ultra-high molecular weight polyethylene film or strip meet at least one or more of the following conditions:
   breaking strength is above 10 grams/denier;
   tensile modulus is above 800 grams/denier; and
   elongation at break is below 6%.

4. The uni-directional cloth according to claim 3, wherein the ultra-high molecular weight polyethylene film meets at least one or more of the following conditions:
   linear density is above 5000 deniers;
   width is above 100 mm; and
   thickness is below 0.2 mm.

5. The uni-directional cloth according to claim 3, wherein the ultra-high molecular weight polyethylene strip meets at least one or more of the following conditions:
   linear density is above 100 deniers;
   width is 1-100 mm; and
   thickness is below 0.2 mm.

* * * * *